Figure 1:
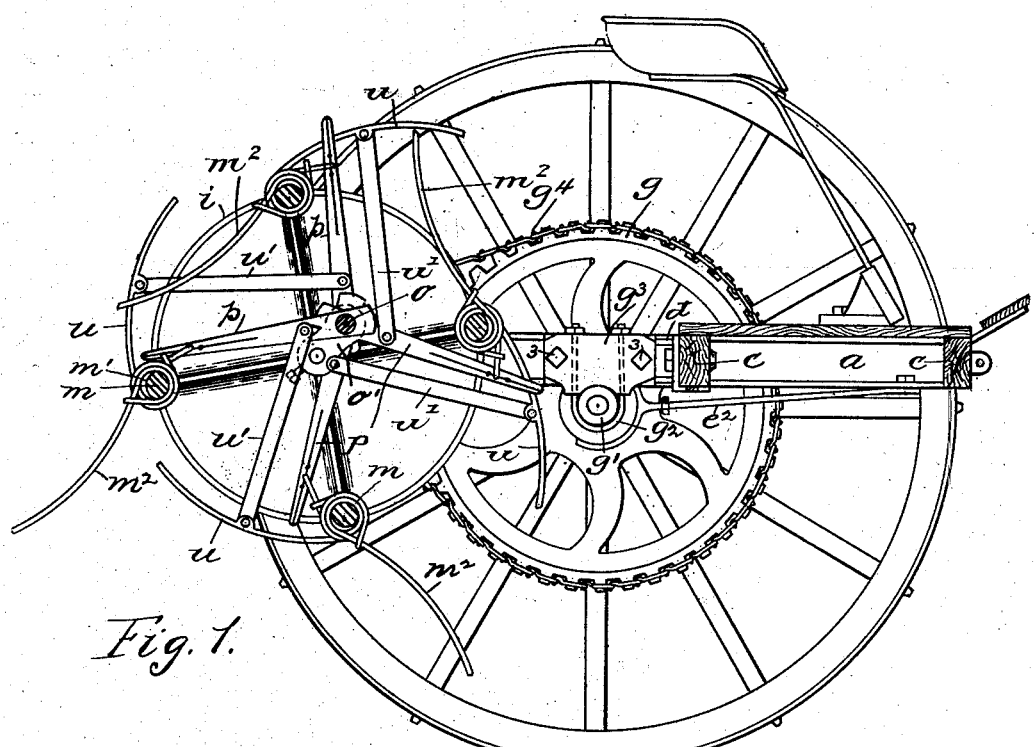

No. 757,372. PATENTED APR. 12, 1904.
C. W. WARNER.
HAY TEDDER.
APPLICATION FILED SEPT. 6, 1898.
NO MODEL. 3 SHEETS—SHEET 1.

Witnesses:
H. B. Davis.
J. L. Hutchinson.

Inventor:
Charles W. Warner
by B. J. Hayes
Atty

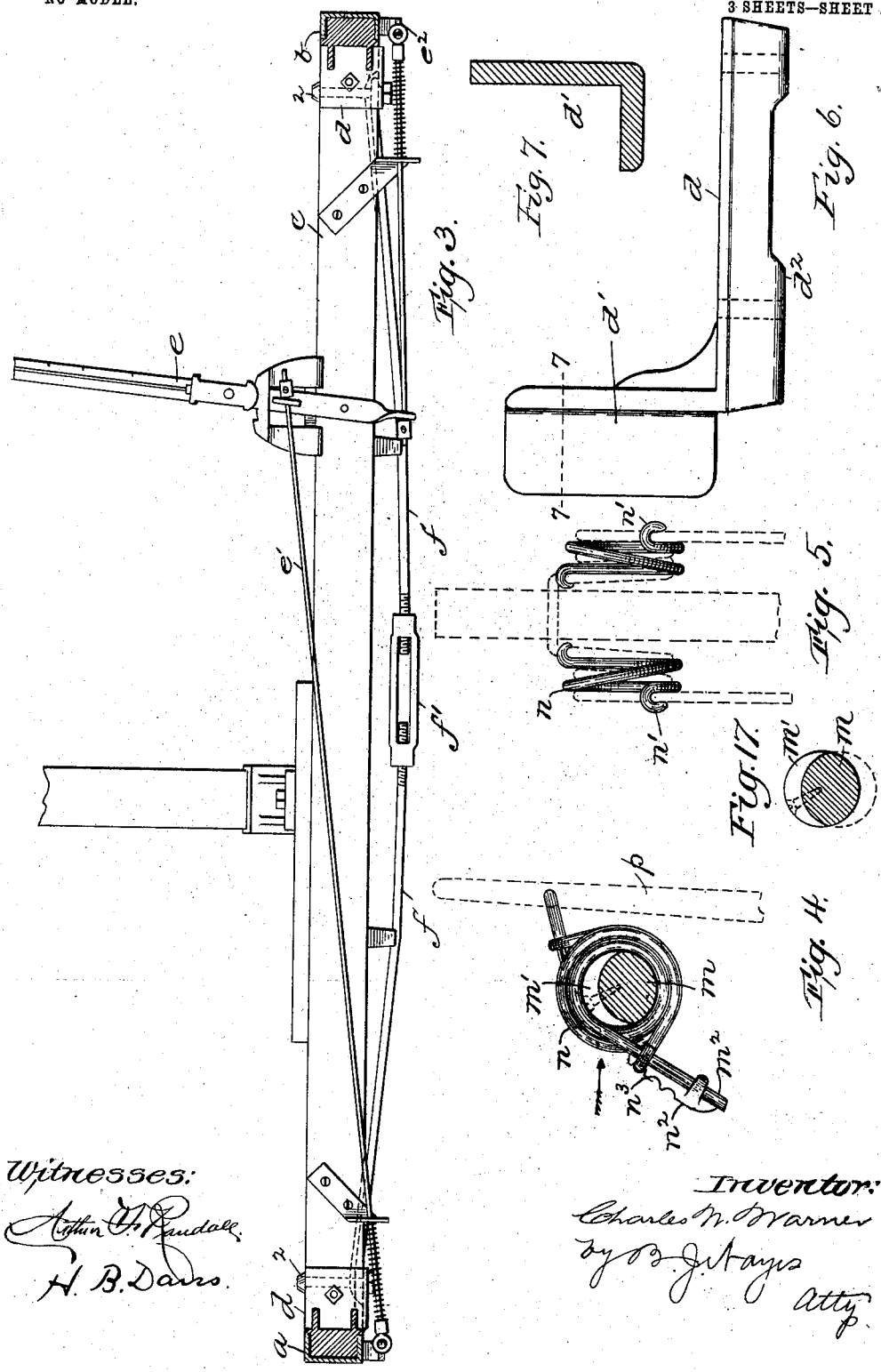

No. 757,372. PATENTED APR. 12, 1904.
C. W. WARNER.
HAY TEDDER.
APPLICATION FILED SEPT. 6, 1898.
NO MODEL. 3 SHEETS—SHEET 3.
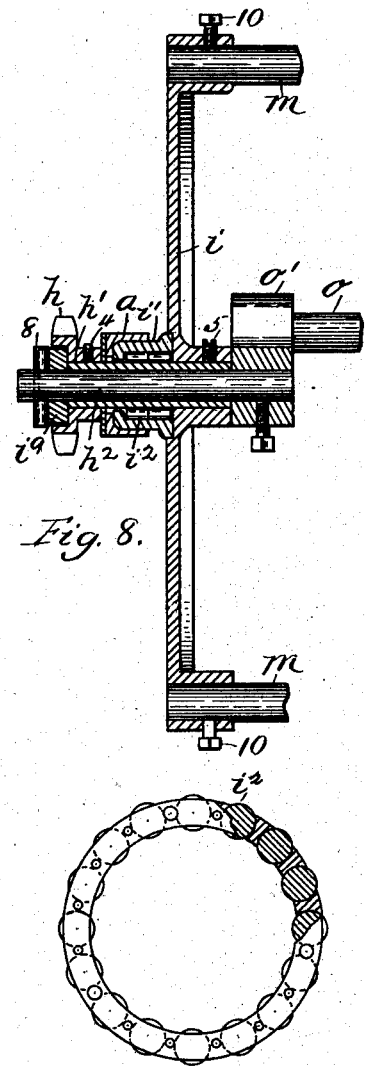
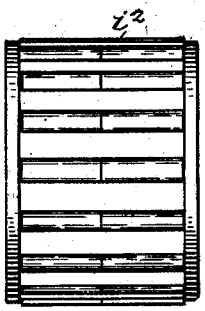
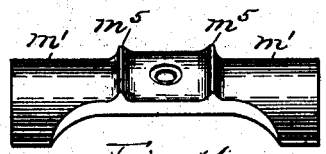
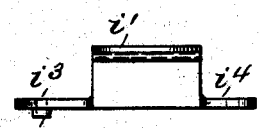
Witnesses:
H. B. Davis.
J. L. Hutchinson.
Inventor:
Charles W. Warner
by B. J. Noyes
Atty No. 757,372.

Patented April 12, 1904.

UNITED STATES PATENT OFFICE.

CHARLES W. WARNER, OF MELROSE, MASSACHUSETTS.

HAY-TEDDER.

SPECIFICATION forming part of Letters Patent No. 757,372, dated April 12, 1904.

Application filed September 6, 1898. Serial No. 690,262. (No model.)

*To all whom it may concern:*

Be it known that I, CHARLES W. WARNER, of Melrose, county of Middlesex, and State of Massachusetts, have invented an Improvement in Hay-Tedders, of which the following description, in connection with the accompanying drawings, is a specification, like characters on the drawings representing like parts.

This invention has for its object to improve the construction of hay-tedders whereby the speed of the fork-carrying reel may be increased and at the same time the draft of the machine reduced, and also whereby the velocity of the forks at the points where they contact with the grass may be materially increased, resulting in picking up and turning the hay as perfectly as if done by a hand-fork and also opening thoroughly and shaking out the hay, leaving it light and turned up with its fibers crossed in every direction to receive the air and sun, and also whereby the points of the tines of the forks as they are lifted and operated to strip the hay at the end of the tedding stroke will lie outside of the path of movement of the fork-carrying bars, so that the hay upon leaving the forks will fall outside of the reel, and also whereby the ground-wheels may be located much nearer the ends of the reel bearing the forks, so that the endmost forks on the reel will operate much nearer the tracks of the ground-wheels.

In carrying out this invention I provide a machine with chains and sprocket-wheels in lieu of gears which have been employed in this type of machine and also provide roller-bearings for the journals, which result in materially reducing the draft of a machine and also in enabling the fork-carrying reel to be driven at an increased speed, and I also relocate the longitudinal fork-carrying bars on the reel relatively to the stationary eccentric bar, so that whenever one of the fork-carrying bars arrives at a position beneath or in a vertical plane with the eccentric bar the forks carried by it are at the beginning of their tedding stroke, and the forks carried by the bar at the opposite side of the reel are at the end of their tedding stroke or substantially at the beginning of their stripping stroke, and said last-named forks will be disposed with their points outside of the path of movement of the bars, so that as said forks strip the hay the hay will fall outside of the reel, and whenever one of the bars occupies a position in a vertical plane with the eccentric bar the bar next to and which follows it will occupy a position substantially in a horizontal plane with said eccentric bar. Such disposition of the bars relatively to the eccentric bar not only enables the hay to fall outside of the reel, but also enables the velocity of the points of the forks when in contact with the grass during the tedding stroke to be materially increased, resulting in better manipulating and likewise kicking or throwing the hay. In order that the forks carried by said bars may be adjusted to vary the velocity of the points during the tedding stroke, I provide cams on the fork-carrying bars, upon which the forks are mounted to turn as on a pivot, and said bars are adjustably supported at their ends so that they may be turned on their axes and the position of the cams thus varied, although it is obvious that the said cams may be otherwise adjusted. Strippers are or may be provided for the forks, which are herein shown as borne and also operated by the reel. To bring the ground-wheels much closer to the ends of the reel bearing the forks, the said bars of the main frame are made straight, and the reel is supported by and movable with a sleeve or quill, which is mounted upon a stationary axle which supports the eccentric bar, and said sleeve and axle contained within it are supported by roller-bearings located at the rear ends of the side bars of the frame, and a sprocket-wheel is secured to said sleeve to rotate it.

Figure 2:
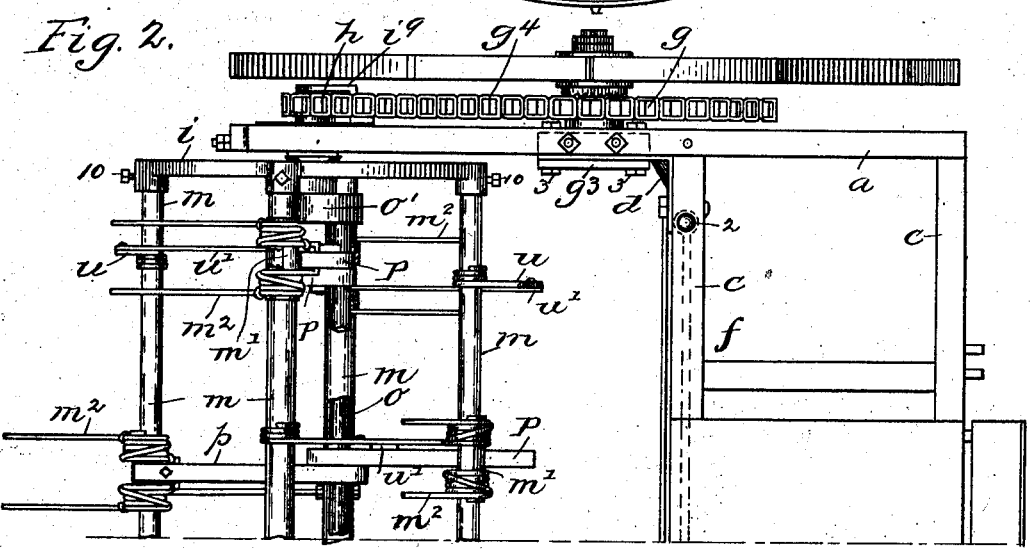

Figure 1 shows a vertical section of a hay-tedder embodying this invention; Fig. 2, a plan view of the same; Fig. 3, a rear side elevation of one of the cross-bars of the frame; Figs. 4 and 5, details of the tedder-fork; Figs. 6 and 7, details of one of the corner-blocks of the frame; Fig. 8, a vertical section of one end bearing of the reel; Figs. 9 to 15, inclusive, details of the bearing for the reel; Fig. 16, a detail showing one of the cams on the fork-carrying bars on which the forks are mounted looking in the direction of the arrow, Fig. 4; Fig. 17, a cross-sectional detail of one of the fork-carrying bars to be referred to.

The main frame of the tedder is herein shown as composed of two side bars $a$ $b$ of channel-iron and cross-bars $c$ of wood, said parts being bolted or otherwise secured together. Metallic L-shaped corner-pieces $d$ (see Figs. 3 and 6) are provided, one at each side of the frame, which are formed or provided with right-angular recessed portions $d'$ (see Fig. 7) to receive the end of one of the cross-bars $c$ and also with a rectangular projection $d^2$, which enters the channel in the metallic side bar, and said corner-pieces are bolted to the cross-bar and side bar.

One of the cross-bars $c$ (see Fig. 3) has pivoted to it a hand-lever $e$, to the lower end of which rods or bars $e'$ $e'$ are attached, the opposite or outer ends of said rods or bars being connected to pivoted levers $e^2$, which are adapted to engage and operate any usual clutches for the driving or ground wheels. This cross-bar $c$ is stiffened by brace-rods $f$ $f$, the inner ends of which are joined together by a turnbuckle $f'$, and the outer ends of said rods have eyes through which pass the bolts 2, by which the corner-pieces $d$ are secured in place.

The sprocket-wheels $g$, of which there are two, one at each side of the machine, are journaled in boxes $g'$, supported beneath the channel-iron side bars $a$ $b$ by means of hoops or loops $g^2$, which pass up through said side pieces, and plates $g^3$ are secured to the inner sides or faces of the corner-pieces $d$ by bolts 3 or otherwise, up against the lower edge of which plates said boxes are drawn and held by the hoops or loops $g^2$. The sprocket-wheels $g$ are engaged and driven by the driving or ground wheels. Sprocket-chains $g^4$ pass over said sprocket-wheels $g$ and also over sprocket-wheels $h$, which latter are located at the rear part of the machine and are provided for driving the reel bearing the forks. The sprocket-wheel $h$ (see Fig. 8) is secured to one end of a sleeve $h'$ by a pin 4 or otherwise passing through the hub of the sprocket-wheel, and said sleeve $h'$ is mounted to revolve freely upon a stationary axle $h^2$, which is made longer than the sleeve to project therefrom at each end. To the opposite or inner end of the sleeve $h'$ one of the reel-heads or end pieces $i$ is secured by a pin 5 or otherwise, so that the reel will turn with the sleeve. The sleeve $h'$ is set in a bearing composed of rollers $i^2$, contained in a box $i''$, and said roller-bearing is located substantially midway the length of the sleeve, so that the driving or sprocket wheel $h$ will be disposed at one side of the bearing and the reel-head $i$ will be disposed at the opposite side thereof. The bearing-box $i'$ is of suitable size and shape to fit in the channel of the side bar $a$, and said side bar is slotted longitudinally, as at $h^3$, (see Fig. 10,) to provide a passage for the sleeve $h'$ and axle, and when the said bearing-box is thus contained in the said channel the sleeve and axle contained within said sleeve will pass through the slotted portion $h^3$ of the side bar, and the sprocket-wheel $h$ will then occupy a position outside of said side bar and the reel-head will occupy a position at the inside of said side bar. The bearing-box $i'$ is adapted to be moved along or adjusted in the channel of said side bar, said channel serving as a guideway, and when thus adjusted all the parts supported by the roller-bearing will be adjusted with it. As a means of adjusting the bearing-box $i'$ back and forth said box $i'$ is herein shown as formed or provided at each end with an ear $i^3$ $i^4$. (See Fig. 13.) The front ear $i^3$ has a lateral projection 6, which enters and works along in a slot 7, formed in the side bar $a$, (see Fig. 10,) and the rear ear $i^4$ has attached to it by a bolt 9 a block $i^5$, which is formed or provided with a rearwardly-extended screw $i^6$, which passes through a hole in an end piece $i^7$, which is fitted upon and secured to the rear end of the side bar, said screw receiving upon it nuts $i^8$. This screw and its coöperating parts constitute an adjusting device for the bearing-box $i'$ by which it may be moved along in the channel of the side bar as a guideway, such adjustment enabling the sprocket-chain to be taken up as may be required. The bearing-box $i'$ is set into a recess formed in the reel-head, to thus prevent the hay from entering between said parts.

A curved plate $i^9$ (see Figs. 9 and 11) is secured to the outer end of the lateral projection 6 on the ear $i^3$ by a bolt 12, which passes through said projection and ear, and said curved plate $i^9$ has a hole through it near its extremity which receives the outer end of the stationary axle $h^2$, and a pin 8 is driven through the outer projecting end of the stationary axle $h^2$ outside of this plate, which holds the parts assembled. The outer end of the curved plate $i^9$ has formed on its inner side or face a circular boss, (see Fig. 8,) which enters a correspondingly-shaped recess in the outer side or face of the sprocket-wheel $h$ and which abuts against the outer end of the sleeve $h'$, and the opposite or outer side of the said curved plate $i^9$ is formed or provided with a groove which receives the pin 8, which is driven through the outer projecting end of the stationary axle $h^2$. The axle $h^2$ is thus held by the pin 8 against rotation. A plate $i^{10}$ is placed on the outside of and next to the side bar $a$ between it and the hub of the sprocket-wheel $h$, and said plate (see Fig. 12) has three holes through it—one for the bolt 9, one for the bolt 12, and one for the sleeve and axle. It will be thus observed that the sleeve and axle and all the parts mounted upon or secured thereto will be moved or adjusted together.

At each side of the machine a sleeve, as $h'$, and a roller-bearing box therefor, all as heretofore described, will be provided, and the two ends or heads $i$ of the fork-bearing reel are secured to the rotating sleeves $h'$.

Within the reel a bar $o$ is secured by short arms $o'$ to the inner projecting ends of the stationary axles $h^2$ $h^2$, and said short arms $o'$ project therefrom at an angle of approximately forty-five degrees from a perpendicular, so that said bar $o$ is eccentric to the axis of the reel.

It will be seen that herein the reel is supported by sleeves $h'$, being mounted upon and secured to them, and that the stationary axles $h^2$ and eccentric bar $o$ are also supported by said sleeves, being contained within them, and that said sleeves are supported by roller-bearings contained in the bearing-boxes supported by and at the rear ends of the side bars, and such construction enables me to materially shorten the stationary axles and sleeves and insures compactness of parts, whereby the ground-wheels may be located much nearer the ends of the reel than heretofore, and consequently the endmost forks on the reel will operate much nearer the track of the ground-wheels than heretofore.

The reel-heads $i$ are joined together by longitudinal fork-carrying bars $m$, (see Figs. 1 and 2,) which are secured in place by means of set-screws 10, and said bars $m$ are or may be also additionally supported. The set-screws 10 in addition to securing the bars $m$ in place permit adjustment of said bars on their axes.

The fork-carrying bars $m$ are herein shown as cylindrical bars of wood, made somewhat oval in shape or being reduced or flattened on one side, (see Figs. 4 and 17,) the uppermost bar (illustrated in Fig. 1) being shown in said figures. These bars may be produced by removing a portion of the material from one side of a truly cylindrical bar. In Fig. 17 the full lines represent the oval-shaped or flattened bar and the dotted lines indicate the portion which has been removed in producing said bar. Cams $m'$ are secured to the sides of said bars opposite said flattened sides at any desired points along the bars in the direction of their length, and the forks $m^3$, which may be of any usual or suitable construction and provided with circularly-formed bearing portions, are mounted upon the bars $m$ at such points as to embrace the cams $m'$. The cams $m'$ are formed each with two ribs $m^5$ at the central portion (see Fig. 16) and with curved or cylindrical portions at each end, which are embraced by the forks, and the curvature given to the ends of the cams is such that when the said cams are secured to the bars $m$ circularly-formed bearings will be provided, which are embraced by the forks.

The fork-carrying bars $m$ with the cams $m'$ thereon are secured to the heads of the reel with the cams disposed remotely from the axis of the reel, and said bars are also secured to the reel in such relation to each other that as one of them arrives at a position beneath the eccentric bar $o$ (see Figs. 1 and 2) the bar next to and following it will occupy a horizontal plane with said bar $o$, or substantially so, and with these bars $m$ occupying such position relative to the eccentric bar $o$ and bearing the cams $m'$, disposed as shown, the uppermost bar of the reel will support the forks with the points of their tines projecting outside of the path of the movement of the fork-carrying bars of the reel, and in consequence the hay will fall from said forks outside of the reel. When one of the bars is beneath and in a vertical plane with the eccentric bar $o$, as shown in Fig. 1, the forks borne by it will be at the beginning of the tedding stroke and the forks on the bar opposite to it will at such time occupy a position at the end of the tedding stroke or in such position as to strip the hay. In practice I have found that by so constructing and locating the fork-carrying bars and providing them with cams $m'$ the velocity of the tines of the forks during the tedding stroke may be very materially increased as compared with tedders of this type heretofore constructed. The bars $m$ are flattened upon their sides nearest the axis of the reel and the cams are consequently located upon the opposite sides of the bars; yet said cams are so disposed on the bars that a line drawn through them at right angles to the chord of the arc of the cam will not be radial to the axis of the reel, but will form a chord of the reel.

The forks $m^2$ have loops or eyes at their crowns, which are engaged by fork-arms $p$, loosely mounted on the eccentric bar $o$, so that as the reel is rotated the forks will be operated. The fork-arms $p$ are each provided with two or more holes, (see Fig. 1,) any one of which will receive the loop or eye at the crown, thereby providing for adjustment of the fork.

I have herein shown the machine as provided with strippers for the forks, they being represented as arms $u$, loosely mounted on the fork-carrying bars $m$ and links $u'$, pivotally connected at one end to said arms $u$ at points substantially midway their length, and also pivotally connected at the opposite end to the fork-carrying arm $p$, near the bar $o$, and said stripper-arms are located on the bars $m$, so as to enter between the tines of the forks on the bar ahead of it, and it will be seen that as the reel is revolved and the forks $m^2$ operated the strippers $u$ will also be operated to strip the hay from the forks. Braces $n$ are provided for the forks, which strengthen and position the tines relative to the crown, and they have hooks $n'$ at the ends which engage the tines of the forks, and I have herein provided on each tine a wedge-block $n^2$, which is formed or provided with a number of grooves $n^3$, and the hooks $n'$ are adapted to engage any one of said grooves, thereby adjusting the direction of the tines relative to the crown.

The roller-bearing herein shown forms the subject-matter of a divisional application, Serial No. 174,030, filed by me September 21, 1903, so is not herein claimed.

I claim—

1. In a hay-tedder, a reel having several fork-carrying bars, a stationary bar disposed eccentric to the axis of the reel and adjustable relative thereto, forks carried by the fork-carrying bars and fork-arms mounted on said eccentric bar and adjustably connected with the crowns of said forks, substantially as described.

2. In a hay-tedder, a reel having longitudinal fork-carrying bars bearing cams and forks having circular bearing portions embracing said bars and cams, substantially as described.

3. In a hay-tedder, a reel having longitudinal fork-carrying bars reduced on one side, and cams secured to said bars opposite the said reduced sides, substantially as described.

4. In a hay-tedder, a reel having longitudinal fork-carrying bars adjustable on their axes bearing cams on which the forks are mounted and means for holding said bars in adjusted position on their axes, substantially as described.

5. In a hay-tedder, a reel having longitudinal fork-carrying bars adjustable on their axes, bearing cams on which the forks are mounted and means for holding the bars with said cams in different positions to vary the velocity of the forks during their tedding stroke, substantially as described.

6. In a hay-tedder, a reel having fork-carrying bars provided with cams upon which the forks are mounted, said cams being adjusted so that lines at right angles to the chords of their arcs form chords to the arc of the reel, substantially as described.

7. In a hay-tedder, two sets of rollers, bearing-boxes therefor, and supports for said boxes, stationary axles having rotary sleeves thereon passing through said boxes, a reel having end pieces or heads secured to said sleeves and means for rotating said sleeves, and an eccentric bar secured to the inner or adjacent ends of said stationary axles, substantially as described.

8. In a hay-tedder, several tedder-forks carried by a reel, means for operating them, combined with stripper-arms loosely mounted on the fork-carrying bars and adapted to operate between the tines of the forks, and means for operating them, substantially as described.

9. In a hay-tedder, several tedder-forks carried by a reel, means for operating them, combined with stripper-arms for the forks loosely mounted on the fork-carrying bars, and links connecting them with the fork-arms, substantially as described.

10. A tedder-fork having a crown and tines, a brace for holding said crown and tines in a predetermined relative position, and a wedge-block for adjusting the relative position of the crown and tines of the fork, substantially as described.

In testimony whereof I have signed my name to this specification in the presence of two subscribing witnesses.

CHARLES W. WARNER.

Witnesses:
B. J. NOYES,
J. L. HUTCHINSON.